US010394020B2

(12) United States Patent
Ishida

(10) Patent No.: US 10,394,020 B2
(45) Date of Patent: Aug. 27, 2019

(54) IMAGE FORMING APPARATUS THAT OBTAINS VARIATION CHARACTERISTIC OF POSITIONAL DEVIATION AMOUNT OF LIGHT BEAM

(71) Applicant: Kyocera Document Solutions Inc., Osaka (JP)

(72) Inventor: Hideki Ishida, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 250 days.

(21) Appl. No.: 15/663,585

(22) Filed: Jul. 28, 2017

(65) Prior Publication Data

US 2018/0031825 A1 Feb. 1, 2018

(30) Foreign Application Priority Data

Jul. 28, 2016 (JP) ................................ 2016-149001

(51) Int. Cl.
*G02B 26/12* (2006.01)

(52) U.S. Cl.
CPC .................................. *G02B 26/123* (2013.01)

(58) Field of Classification Search
CPC .. G02B 26/123; G02B 26/127; H04N 1/0671; H04N 1/113; G02F 1/29
USPC ........................................ 250/235, 236, 216
See application file for complete search history.

(56) References Cited

U.S. PATENT DOCUMENTS 5,654,817 A * 8/1997 De Loor .................. B41J 2/473
359/201.1

FOREIGN PATENT DOCUMENTS

JP H09-080334 A 3/1997

* cited by examiner

*Primary Examiner* — Que Tan Le
(74) *Attorney, Agent, or Firm* — HEA Law PLLC

(57) ABSTRACT

An image forming apparatus includes a light scanning device, a light detection unit, and a positional-deviation-amount calculation unit. The light detection unit includes a slit-shaped first light detection region and a slit-shaped second light detection region arranged to have mutually different angles with respect to a scanning direction of the light beam, and outputs a detection signal when the light beam passes through each of the light detection regions. The positional-deviation-amount calculation unit calculates a time period until when the light beam passes through the second light detection region from when the light beam has passed through the first light detection region for each scan of the light beam based on the detection signal output from the light detection unit, and calculates a variation characteristic of a positional deviation amount in a sub-scanning direction of the light beam associated with rotation of the polygon mirror.

4 Claims, 12 Drawing Sheets

IMAGE FORMING APPARATUS THAT OBTAINS VARIATION CHARACTERISTIC OF POSITIONAL DEVIATION AMOUNT OF LIGHT BEAM

INCORPORATION BY REFERENCE

This application is based upon, and claims the benefit of priority from, corresponding Japanese Patent Application No. 2016-149001 filed in the Japan Patent Office on Jul. 28, 2016, the entire contents of which are incorporated herein by reference.

BACKGROUND

Unless otherwise indicated herein, the description in this section is not prior art to the claims in this application and is not admitted to be prior art by inclusion in this section.

In general, a typical image forming apparatus using a electrophotographic method includes a light scanning device that irradiates a surface of a photoreceptor drum with a light beam corresponding to image data, and causes the light beam to scan in a main-scanning direction.

The light scanning device includes a light source, a polygon mirror, an imaging lens, and a reflecting mirror. The polygon mirror reflects the light beam emitted from the light source to cause the light beam to deflectively scan. The imaging lens causes the light beam reflected by the polygon mirror to form an image on a scanned surface. The reflecting mirror reflects the light beam that has passed through the imaging lens toward the scanned surface.

In this type of light scanning device, a rotational vibration of a polygon mirror sometimes transmits to an optical element such as an imaging lens or a reflecting mirror to vibrate the optical element. Vibrating the optical element causes a light beam on a scanned surface to generate a positional deviation in a sub-scanning direction and then causes an image failure such as a print-density unevenness or jitter.

SUMMARY

An image forming apparatus according to one aspect of the disclosure includes a light scanning device, a light detection unit, and a positional-deviation-amount calculation unit. The light scanning device includes a light source, a polygon mirror that reflects a light beam emitted from the light source and causes the light beam to deflectively scan, and an optical element located in an optical path of the light beam deflectively scanned at the polygon mirror. The light detection unit is located in an optical path of the light beam after the light beam has passed through the optical element, includes a slit-shaped first light detection region and a slit-shaped second light detection region arranged to have mutually different angles with respect to a scanning direction of the light beam, and outputs a detection signal when the light beam passes through each of the light detection regions. The positional-deviation-amount calculation unit calculates a time period until when the light beam passes through the second light detection region from when the light beam has passed through the first light detection region for each scan of the light beam based on the detection signal output from the light detection unit, and calculates a variation characteristic of a positional deviation amount in a sub-scanning direction of the light beam associated with rotation of the polygon mirror based on the calculated time period.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
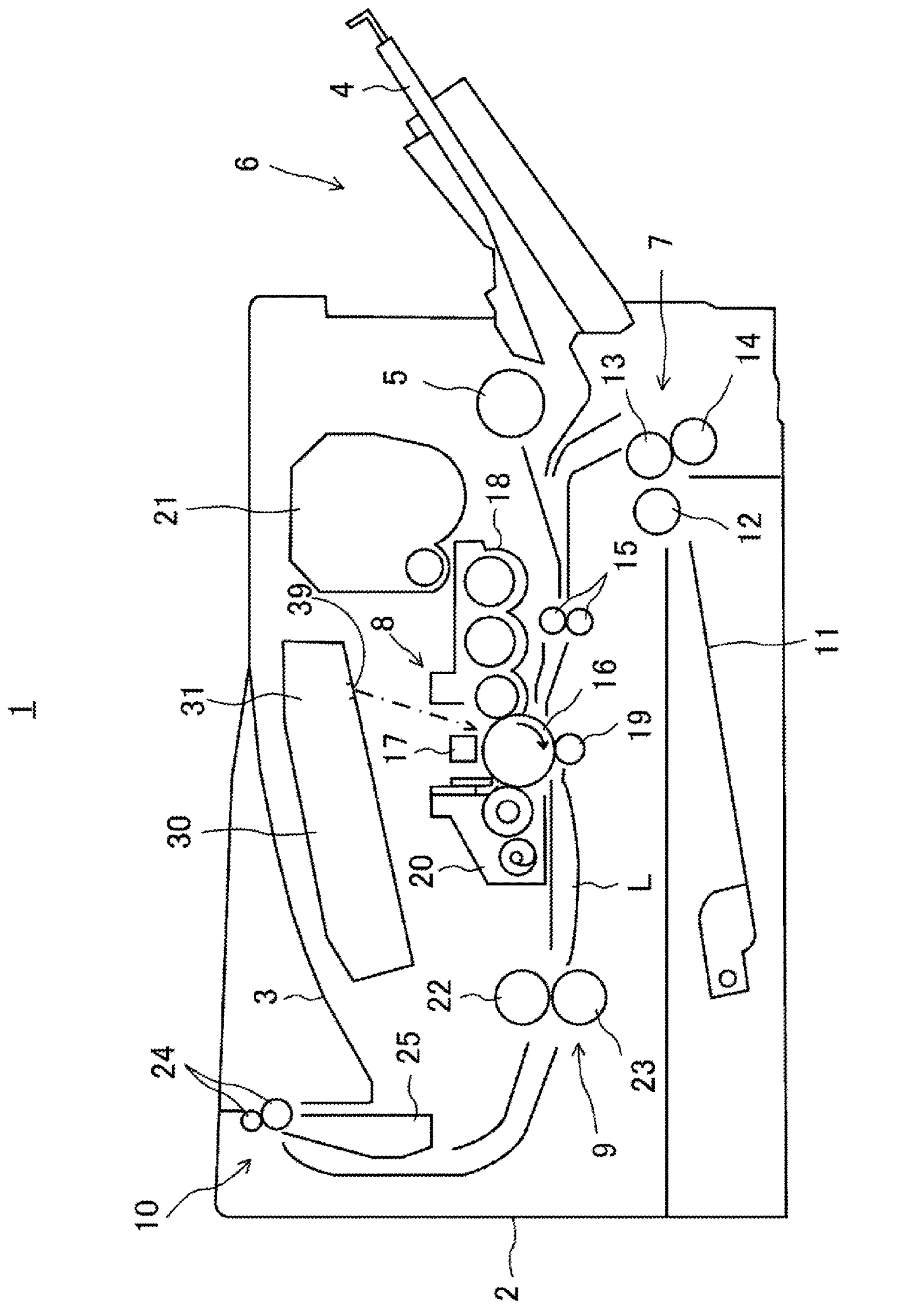
FIG. 1 illustrates an image forming apparatus that includes a light scanning device according to an embodiment.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure with reference to the drawings in detail. The disclosure is not limited to the following embodiments.

Embodiment 1

FIG. 1 illustrates a cross-sectional view that indicates a schematic configuration of a laser printer 1 as an image forming apparatus according to the embodiment.

The laser printer 1, as illustrated in FIG. 1, includes a box-shaped printer main body 2, a manual paper feed tray 6, a cassette paper sheet feeder 7, an image forming unit 8, a fixing unit 9, and a paper sheet discharge unit 10. Then, the laser printer 1 is configured to form an image on a paper sheet based on image data transmitted from a terminal or similar device (not illustrated) while conveying the paper sheet along a conveyance path L inside the printer main body 2.

The manual paper feed tray 6 includes a manual bypass tray 4 and a feed roller 5 for manual paper feeding. The manual bypass tray 4 is openably/closably located on one of the side portions of the printer main body 2. The feed roller 5 is rotatably located inside the printer main body 2.

The cassette paper sheet feeder 7 is located in a bottom portion of the printer main body 2. The cassette paper sheet feeder 7 includes a sheet feed cassette 11, a pick roller 12, a feed roller 13, and a retard roller 14. The sheet feed cassette 11 houses a plurality of paper sheets stacked to one another. The pick roller 12 takes out the paper sheet inside the sheet feed cassette 11 one by one. The feed roller 13 and the retard roller 14 separate the paper sheet, which is taken out, one by one, and send out to the conveyance path L.

The image forming unit 8 is located above the cassette paper sheet feeder 7 inside the printer main body 2. The image forming unit 8 includes a photoreceptor drum 16, a charger 17, a developing unit 18, a transfer roller 19, a cleaning unit 20, a toner hopper 21, and a light scanning device 30. The image forming unit 8 forms a toner image on the paper sheet supplied from the manual paper feed tray 6 or the cassette paper sheet feeder 7.

In the conveyance path L, a pair of registration rollers 15 are located to supply the paper sheet, which is sent out, to the image forming unit 8 at a predetermined timing after causing the paper sheet to temporarily wait.

The fixing unit 9 is arranged in a side portion of the image forming unit 8. The fixing unit 9 includes a fixing roller 22 and a pressure roller 23 that are brought into contact with one another to rotate. The fixing unit 9 fixes the toner image, which has been transferred on a paper sheet by the image forming unit 8, on the paper sheet.

The paper sheet discharge unit 10 is located above the fixing unit 9. The paper sheet discharge unit 10 includes a sheet discharge tray 3, a discharging roller pair 24 for conveying the paper sheet to the sheet discharge tray 3, and a plurality of conveyance-guide ribs 25 that guide the paper sheet to the discharging roller pair 24. The sheet discharge tray 3 is formed in a concave shape in an upper portion of the printer main body 2.

The laser printer 1, which has received image data, rotationally drives the photoreceptor drum 16 and also causes the charger 17 to charge the surface of the photoreceptor drum 16, in the image forming unit 8.

Then, based on the image data, a light beam is emitted to the photoreceptor drum 16 from the light scanning device 30. On the surface of the photoreceptor drum 16, an electrostatic latent image is formed by irradiation of the light beam. The electrostatic latent image is visualized as a toner image by being developed by the toner charged at the developing unit 18.

Subsequently, the paper sheet supplied from the sheet feed cassette 11 passes through between the transfer roller 19 and the photoreceptor drum 16. At this time, the toner image carried on the surface of the photoreceptor drum 16 moves to a printing surface of the paper sheet by undergoing an electrostatic attractive force from the transfer roller 19. This transfers the toner image on the photoreceptor drum 16 to the paper sheet. The paper sheet with the transferred toner image undergoes heating and pressurization by the fixing roller 22 and the pressure roller 23 at the fixing unit 9. This results in fixing the toner image on the paper sheet.

Next, a description will be given of the light scanning device 30 in detail with reference to FIGS. 2 and 3. The light scanning device 30 includes a housing 31 (illustrated only in FIG. 2), a polygon mirror 35, an imaging lens 36, a reflecting mirror 38, and a lid member (not illustrated). The polygon mirror 35 is housed inside the housing 31 and deflectively scans the light beam from a light source 32. The imaging lens 36 causes the light beam, which is deflectively scanned by the polygon mirror 35, to form an image. The reflecting mirror 38 reflects the light beam that has passed through the imaging lens 36 to guide onto the surface of the photoreceptor drum 16. The lid member is mounted onto the housing 31.

The polygon mirror 35 is located on a bottom portion of the housing 31 via a polygon motor 42. The polygon mirror 35 is a rotating polygon mirror having a polygonal-prismatic shape and is rotationally driven by the polygon motor 42. The polygon mirror 35 has, for example, a regular-pentagonal-prismatic shape in the embodiment. On the peripheral side surface of the polygon mirror 35, five reflecting surfaces r1 to r5, which line up in order in a peripheral direction, are formed.

Figure 2:
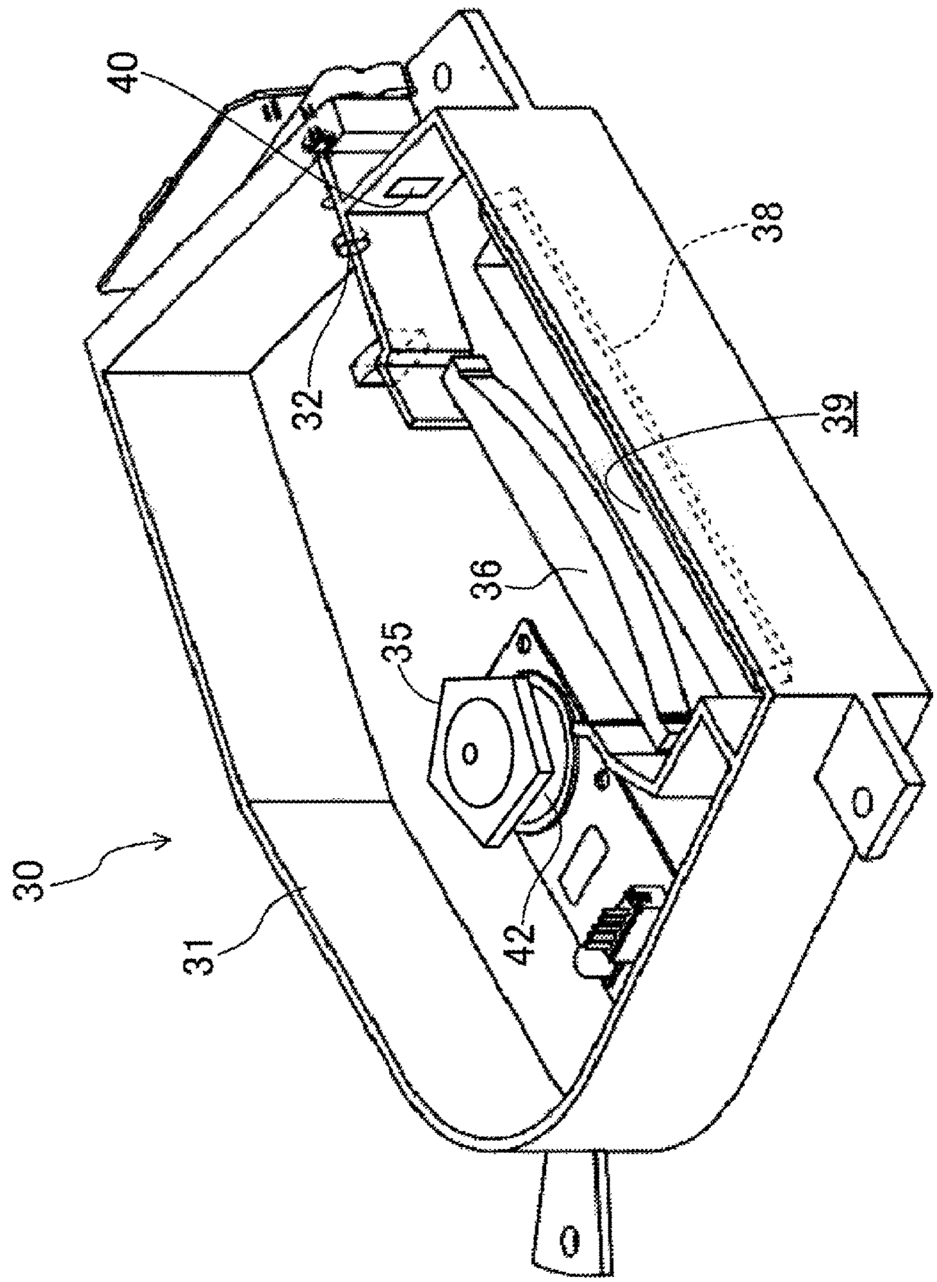
FIG. 2 obliquely illustrates the light scanning device.
Figure 3:
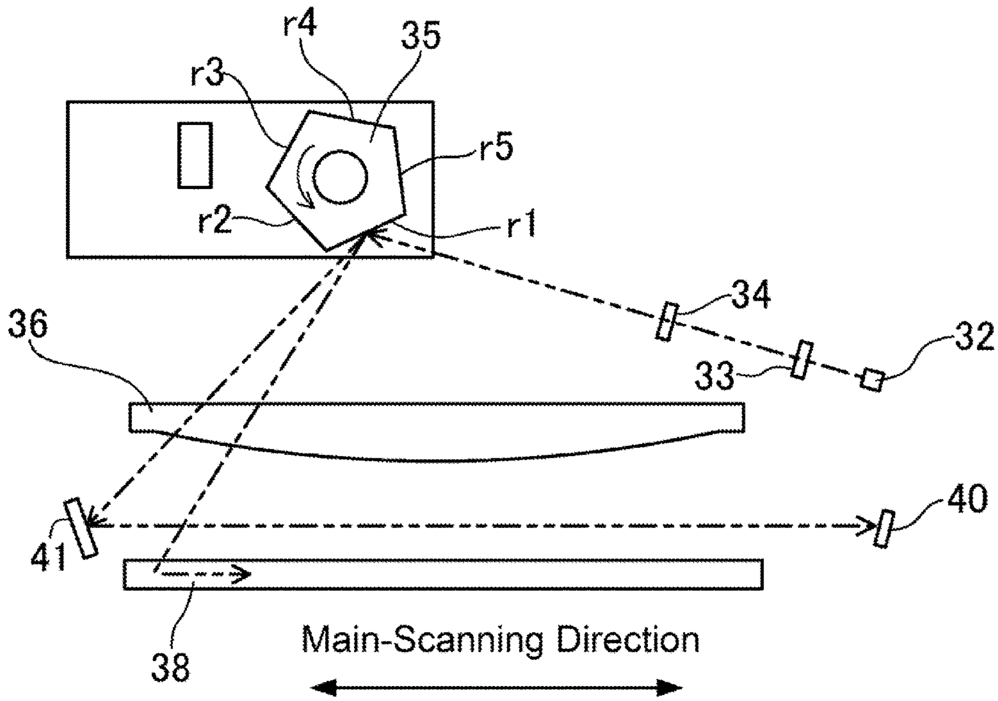
FIG. 3 illustrates a diagram of a scanning optical system inside the light scanning device viewed from a rotation shaft direction of a polygon mirror.

The light source 32 is arranged on a sidewall portion of the housing 31, as illustrated in FIG. 2. The light source 32 is, for example, a laser light source including a laser diode. Then, the light source 32 emits a laser beam (light beam) toward the polygon mirror 35. Between the light source 32 and the polygon mirror 35, a collimator lens 33 (see FIG. 3) and a cylindrical lens 34 are arranged.

The imaging lens 36 is located on the bottom portion of the housing 31 in a side portion of the polygon mirror 35, as illustrated in FIG. 2. The imaging lens 36 extends in a main-scanning direction along the bottom of the housing 31.

Inside the housing 31, the reflecting mirror 38 is arranged on the opposite side to the polygon mirror 35 side with reference to the imaging lens 36. The reflecting mirror 38 has a rectangular-prismatic shape that is long in the main-scanning direction. One side surface in a thickness direction of the reflecting mirror 38 is set as a reflecting surface that reflects the light beam.

A synchronization detection sensor 40 (see FIG. 3) is arranged in the portion opposed to one side-end portion in the main-scanning direction of the reflecting mirror 38, in the sidewall portion of the housing 31. A synchronization detection mirror 41 is located at the proximity of the other side-end portion in the main-scanning direction of the reflecting mirror 38. The synchronization detection mirror 41 reflects the light beam that is deflected by the polygon mirror 35 and travels an optical path deviating from an effective scanning range (a range where writing of image data is actually performed) and then causes the light beam to enter the synchronization detection sensor 40.

The synchronization detection sensor 40 is constituted of, for example, a photodiode, a phototransistor, a photo IC, and similar component. When detecting the light beam, the synchronization detection sensor 40 outputs a detection signal, which indicates the detection, to a control unit 100 (also referred to as a difference-characteristic calculation unit, a positional-deviation-amount calculation unit, and a determining unit).

The control unit 100 is constituted of, for example, a microcomputer including a CPU, a ROM, a RAM, and similar device. The control unit 100 starts emission of the light beam that corresponds to the image data from the light source 32, after a lapse of a predetermined time from the time of reception of the synchronization detection signal.

The laser beam emitted from the light source 32 is condensed on the reflecting surface of the polygon mirror 35 by the cylindrical lens 34 after having been set to a parallel light beam by the collimator lens 33. The light condensed on the polygon mirror 35 is reflected by the reflecting surface of the polygon mirror 35 to enter the imaging lens 36 as scanning light. The scanning light that has passed through the imaging lens 36 is reflected by the reflecting mirror 38 toward the photoreceptor drum 16 outside the housing 31 via an opening 39 (see FIG. 1). Thus, the scanning light forms an image on the surface (equivalent to the scanned surface) of the photoreceptor drum 16. The scanning light, which has formed the image on the surface of the photoreceptor drum 16, forms an electrostatic latent image on the surface of the photoreceptor drum 16 by scanning the surface of the photoreceptor drum 16 in the main-scanning direction by the rotation of the polygon mirror 35 and scanning the surface of the photoreceptor drum 16 in the sub-scanning direction by the rotation of the photoreceptor drum 16.

In the above-described light scanning device 30, deviation of the position of the light beam, which is reflected from the polygon mirror 35, toward the sub-scanning direction with respect to a predetermined position on the surface of the photoreceptor drum 16 sometimes generates an image failure such as jitter. A description will be given of positional-deviation causes in the sub-scanning direction of the light beam with reference to FIGS. 4A to 4D. The two-dot chain lines in the respective drawings represent the light beam. The dashed lines in FIG. 4A represent a state where the reflecting surfaces r1 to r5 of the polygon mirror 35 are inclined, and the dashed lines in FIGS. 4B to 4D represent states where the optical elements vibrate.

Figure 4A:
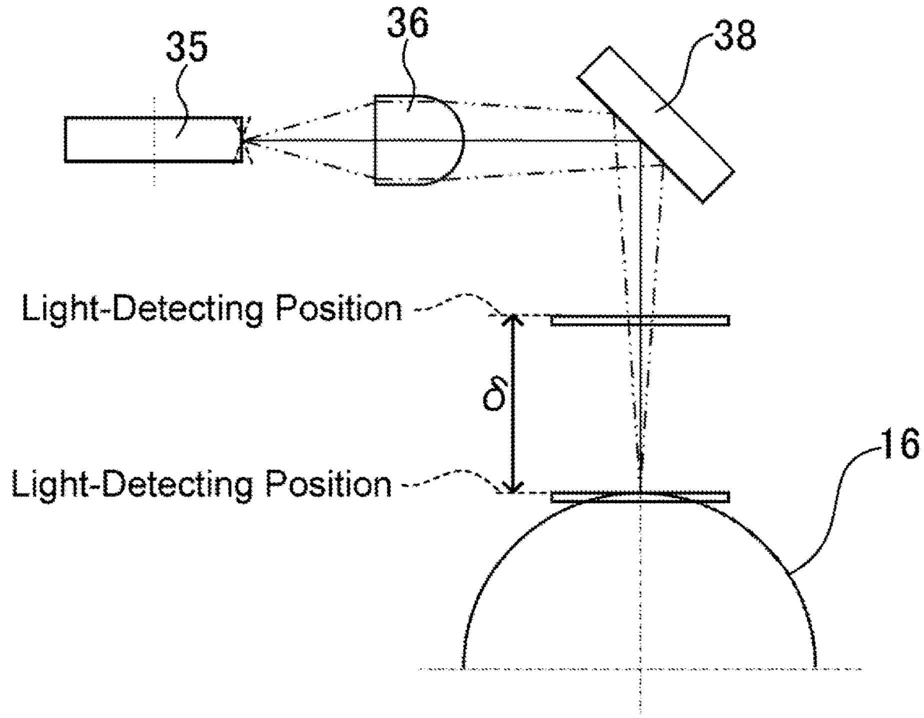
FIG. 4A illustrates an explanatory diagram for describing a positional-deviation cause (a first cause) in a sub-scanning direction of a light beam.
Figure 4B:
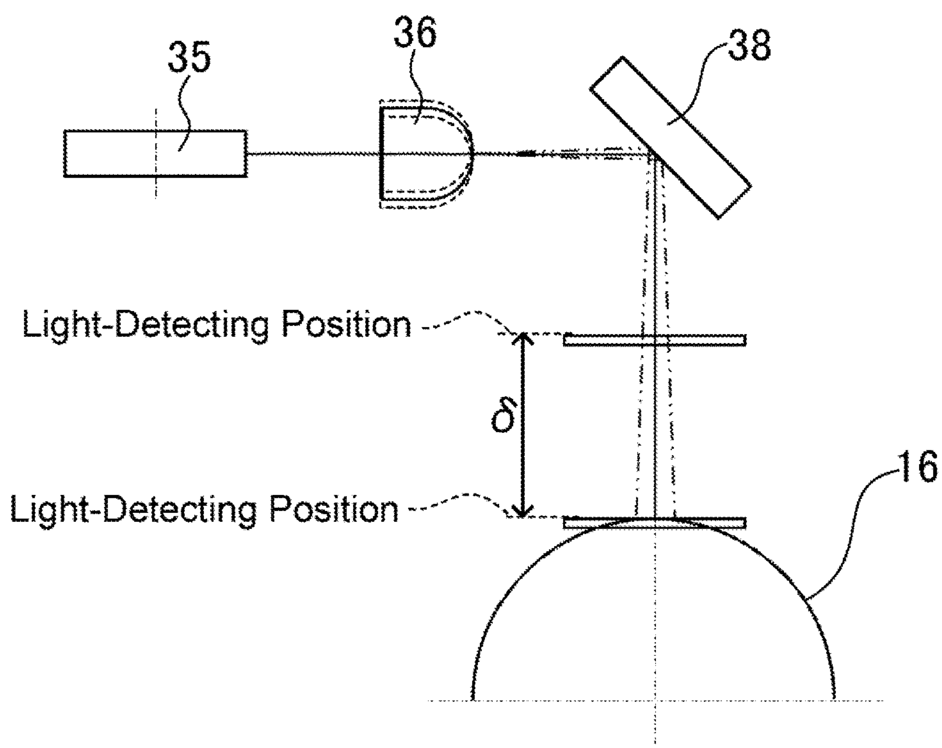
FIG. 4B illustrates an explanatory diagram for describing a positional-deviation cause (a second cause) in the sub-scanning direction of the light beam.
Figure 4C:
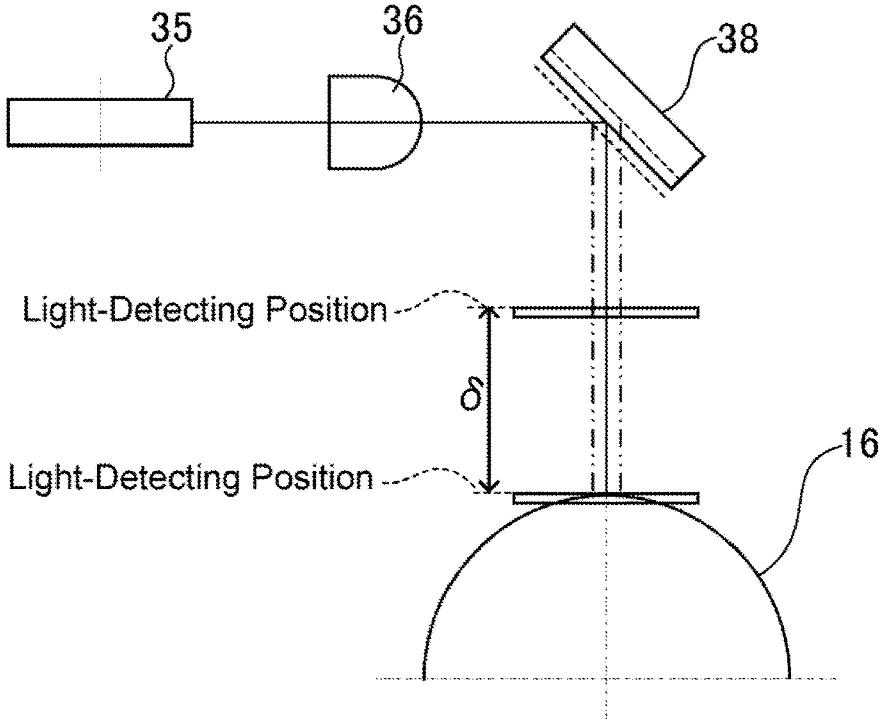
FIG. 4C illustrates an explanatory diagram for describing a positional-deviation cause (a third cause) in the sub-scanning direction of the light beam.
Figure 4D:
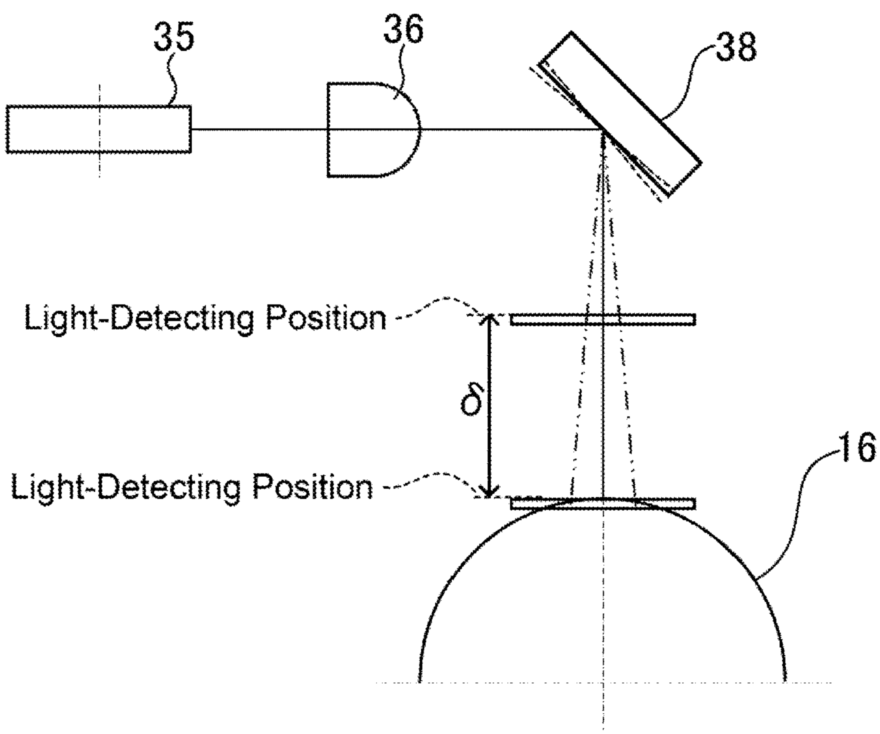
FIG. 4D illustrates an explanatory diagram for describing a positional-deviation cause (a fourth cause) in the sub-scanning direction of the light beam.

A first cause is that the reflecting surfaces r1 to r5 of the polygon mirror 35 are inclined with respect to its rotation shaft because of a machining error or similar error (see FIG. 4A). Inclination of the reflecting surfaces r1 to r5 causes the light beam that enters the imaging lens 36 to swing in a vertical direction. Although a certain degree of a swing is permissible because the imaging lens 36 has power in the sub-scanning direction, a too-large swing amount causes the position of the light beam to deviate in the sub-scanning direction on the surface of the photoreceptor drum 16.

A second cause is a vibration of the imaging lens 36. The vibration of the imaging lens 36 is generated by transmission of a rotational vibration of the polygon mirror 35 to the imaging lens 36. As illustrated in FIG. 4B, the vibration of the imaging lens 36 causes the position of the light beam, which enters the reflecting mirror 38 after passing through the imaging lens 36, to swing in the vertical direction. This results in that the position of the light beam entering the surface of the photoreceptor drum 16 vibrates in the lateral direction of the drawing with the proximity of the incident position of the light beam at the reflecting mirror 38 as a fulcrum. This results in an occurrence of a positional deviation in the sub-scanning direction of the light beam, which enters the surface of the photoreceptor drum 16.

A third cause is a deflection vibration where the center portion in the main-scanning direction of the reflecting mirror 38 vibrates in the thickness direction with respect to both end portions. The deflection vibration of the reflecting mirror 38 is generated by the transmission of the rotational vibration of the polygon mirror 35 to the reflecting mirror 38 (one example of the optical element). The occurrence of the deflection vibration of the reflecting mirror 38, as illustrated in FIG. 4C, causes the position of the light beam, which enters the photoreceptor drum 16, to swing approximately in parallel in the lateral direction of the drawing, and thus, causes the position of the light beam to deviate in the sub-scanning direction on the surface of the photoreceptor drum 16.

A fourth cause is a rotational vibration of the reflecting mirror 38 around an axis extending in the main-scanning direction. The rotational vibration is generated by the transmission of the rotational vibration of the polygon mirror 35 to the reflecting mirror 38 (the one example of the optical element). The occurrence of the rotational vibration of the reflecting mirror 38, as illustrated in FIG. 4D, causes the light beam, which travels toward the surface of the photoreceptor drum 16, to vibrate in the lateral direction of the drawing with the incident position of the light beam at the reflecting mirror 38 as the fulcrum. This results in the occurrence of the positional deviation in the sub-scanning direction of the light beam, which enters the surface of the photoreceptor drum 16.

When the first cause (that is, the inclination of the reflecting surfaces r1 to r5 of the polygon mirror 35) occurs, it is appropriate to reduce the image failure by changing a type of screen (changing a dot pattern of an image) or similar method. When the second to fourth causes (that is, vibration of the optical element) occurs, it is appropriate to change a resonant frequency by correction of a support position of the optical element instead of changing the type of the screen, as reduction countermeasures of the image failure. Thus, the appropriate countermeasures for reducing the image failure differ depending on the positional-deviation cause in the sub-scanning direction of the light beam. Consequently, to reduce the image failure, a technique is required to appropriately determine the positional-deviation cause in the sub-scanning direction of the light beam.

Figure 5:
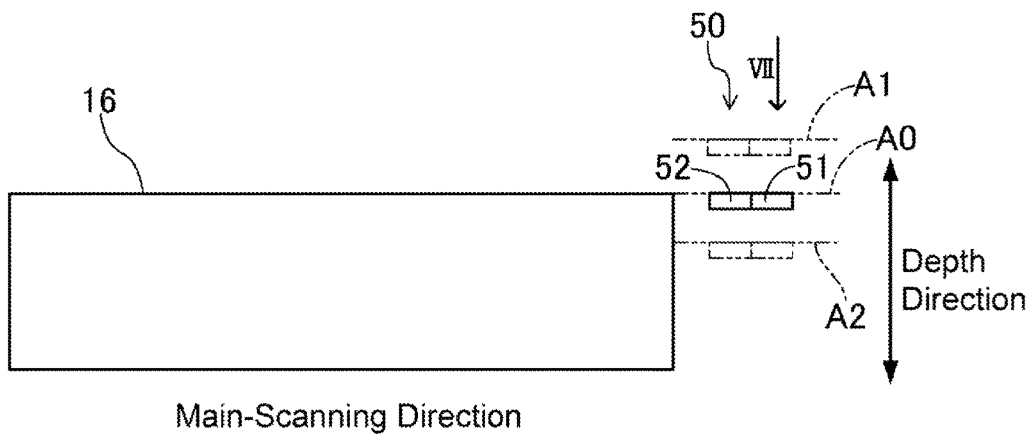
FIG. 5 illustrates an explanatory diagram for describing an arrangement position of a light detection unit.
Figure 6:
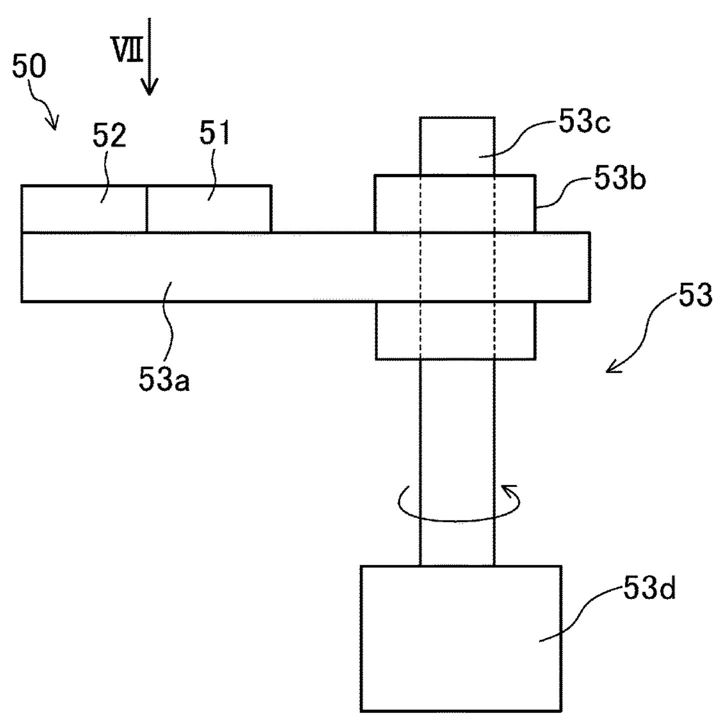
FIG. 6 illustrates a schematic configuration of the light detection unit and a driving unit that drives the light detection unit.

In the embodiment, a light detection unit 50 (see FIGS. 5 and 6) is located in the side portion of the photoreceptor drum 16 to determine the positional-deviation cause in the sub-scanning direction of the light beam at the control unit 100 based on a detection signal output from the light detection unit 50.

The light detection unit 50 includes a first light detection sensor 51 and a second light detection sensor 52 that adjacently line up in the main-scanning direction. The first light detection sensor 51 and the second light detection sensor 52 are constituted of, for example, a photodiode, a phototransistor, a photo IC or similar component. The light detection unit 50 is movably constituted in a depth direction of the light beam, by a driving unit 53 (illustrated only in FIG. 6).

The driving unit 53 includes: a holding plate 53*a* that holds both the sensors 51 and 52; a nut portion 53*b* connected to the holding plate 53*a*; a shaft portion 53*c* that is inserted into and screws with the nut portion 53*b*; and a motor 53*d* that drives the shaft portion 53*c*. Rotationally driving the shaft portion 53*c* by the motor 53*d* moves the nut portion 53*b* and the holding plate 53*a* in an axial direction of the shaft portion 53*c* and, accordingly, moves both the sensors 51 and 52 in the depth direction (in the vertical direction of FIGS. 5 and 6) of the light beam. The light detection unit 50 is configured to be movable to three positions of a reference depth position A0 (also referred to as a predetermined depth position), a first depth position (also referred to as a predetermined depth position and a separation depth position) A1, and a second depth position (also referred to as a predetermined depth position and a separation depth position) A2 by the driving unit 53.

The reference depth position A0 is a position where a detection position of the light beam by both the sensors 51 and 52 becomes flush with an image formation surface (that is, the scanning position of the light on the surface of the photoreceptor drum 16). The first depth position A1 is a position separated by a predetermined distance (10 mm, in the embodiment) on the side closer to the reflecting mirror 38 than the reference depth position A0 in the depth direction of the light beam. The second depth position A2 is a position separated by a predetermined distance (similarly 10 mm, in the embodiment) on the side farther from the reflecting mirror 38 than the reference depth position A0 in the depth direction of the light beam.

Figure 7:
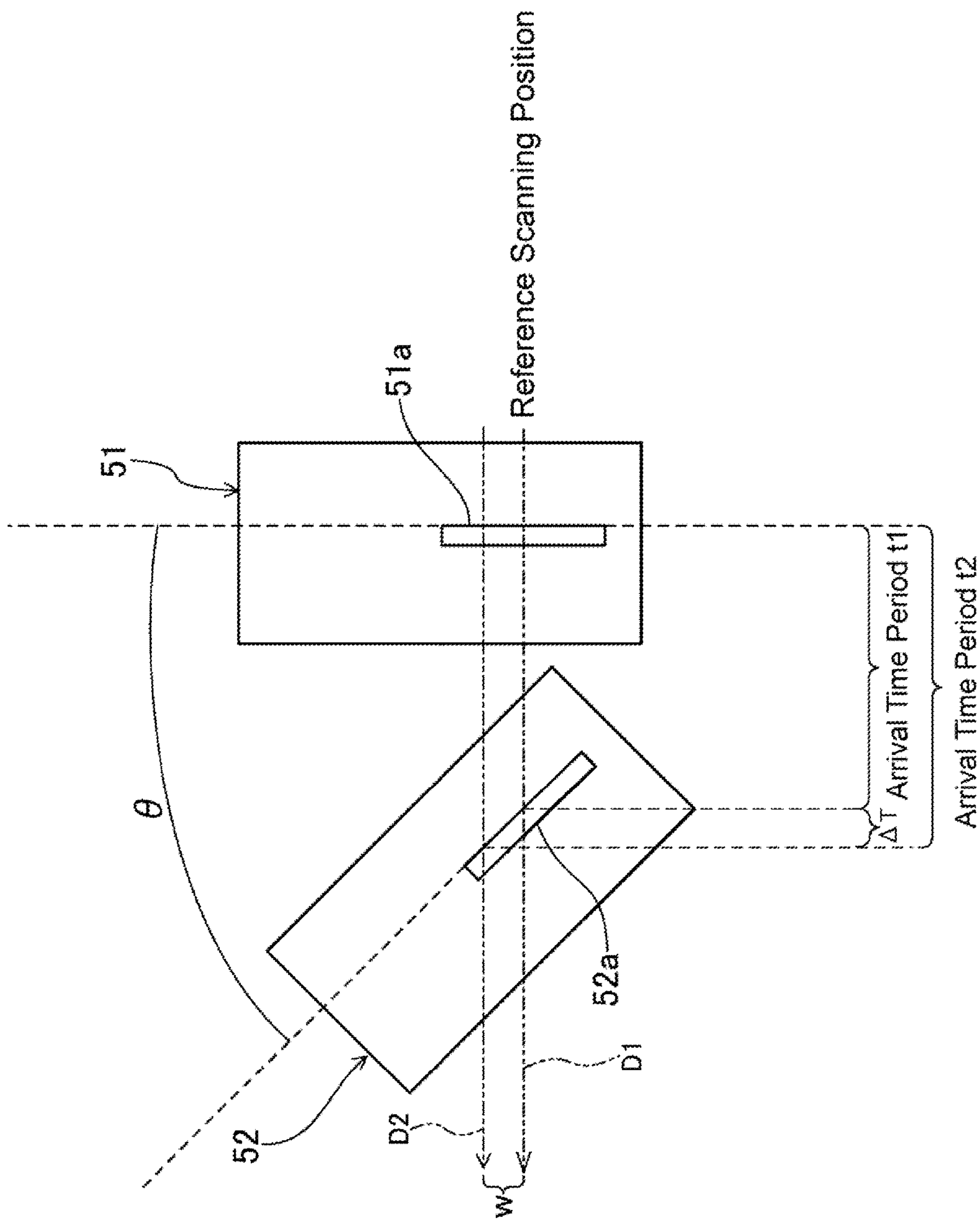
FIG. 7 illustrates VII direction arrow view of FIG. 6.

As illustrated in FIG. 7, the first light detection sensor 51 and the second light detection sensor 52, which constitute the light detection unit 50, include elongated-slit-shaped light detection regions (also referred to as a first light detection region) 51*a* and (also referred to as a second light detection region) 52*a*, respectively. The light detection regions 51*a* and 52*a* intersect with one another at different angles with respect to the scanning direction (the main-scanning direction) of the light beam. The first light detection sensor 51 is arranged such that the light detection region 51*a* extends in the sub-scanning direction (the direction that is perpendicular to the main-scanning direction and is the vertical direction in FIG. 7). The second light detection sensor 52 is arranged such that the light detection region 52*a* is inclined by a predetermined degree $\theta$ with respect to the sub-scanning direction. Here, $\theta$ may be any angle as long as it is the angle larger than zero and smaller than $\pi/2$, and is set to, for example, $\pi/4$ in the embodiment. When detecting the light beam, the first light detection sensor 51 and the second light detection sensor 52 output the detection signal indicative of the detection to the control unit 100.

Figure 8:
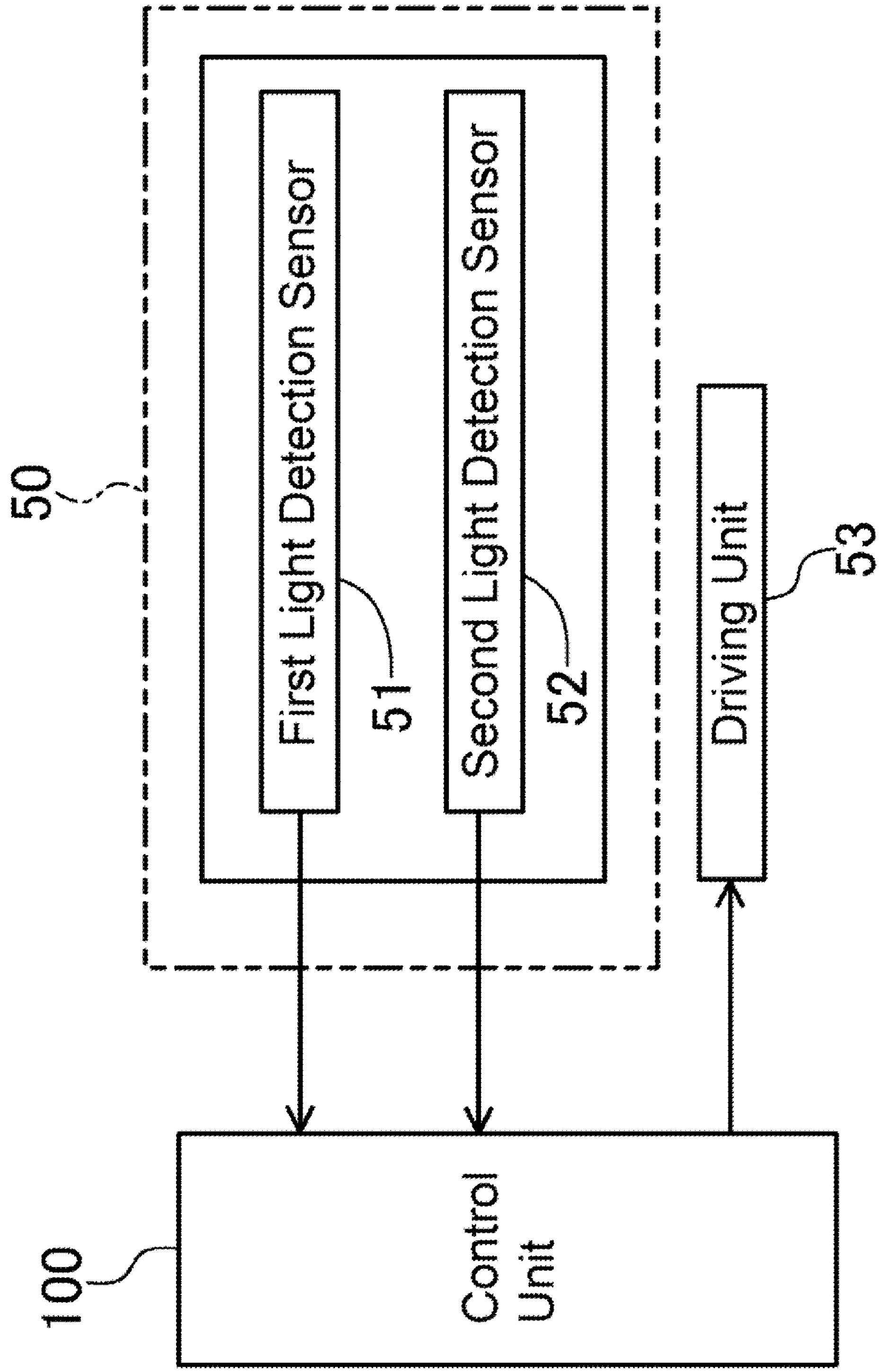
FIG. 8 illustrates a block diagram illustrating a configuration of a control system pertaining to a determination process that determines the positional-deviation cause in the sub-scanning direction of the light beam.

As illustrated in FIG. 8, the control unit 100 is connected to the driving unit 53 in addition to the first light detection sensor 51 and the second light detection sensor 52 via a signal line. Then, the control unit 100 sequentially moves the light detection unit 50 to the reference depth position A0, the first depth position A1, and the second depth position A2 by the driving unit 53 to receive the detection signals from the first light detection sensor 51 and the second light detection sensor 52 at the respective depth positions A0 to A2. Then, based on the detection signals from both the sensors 51 and 52, the control unit 100 calculates positional deviation amounts in the sub-scanning direction of the light beam at the respective depth positions A0 to A2. Specific calculation algorithm is described as follows.

That is, since the light detection region 51*a* and the light detection region 52*a* intersect at the different angles with respect to the main-scanning direction, in a time period until when the light beam arrives at the light detection region 52*a* after passing through the light detection region 51*a*, a difference is generated depending on the position in the sub-scanning direction of the light beam. With reference to the example of FIG. 7, a light beam D1 that scans a preliminarily set reference scanning position and a light beam D2 that scans out of the reference scanning position generate a time difference $\Delta T$ in arrival time periods until when the light beam D1 and the light beam D2 arrive at the light detection region 52*a* after passing through the light detection region 51*a*. In the embodiment, an arrival time period t2 is measured for each scan of the light beam to calculate the time difference $\Delta T$ (=t2−t1) between the measured arrival time period t2 and arrival time period t1 (reference time period). Converting the calculated time difference $\Delta T$ into a distance W in the sub-scanning direction calculates the variation characteristic of the positional deviation amount in the sub-scanning direction of the light beam associated with the rotation of the polygon mirror 35.

Figure 9A:
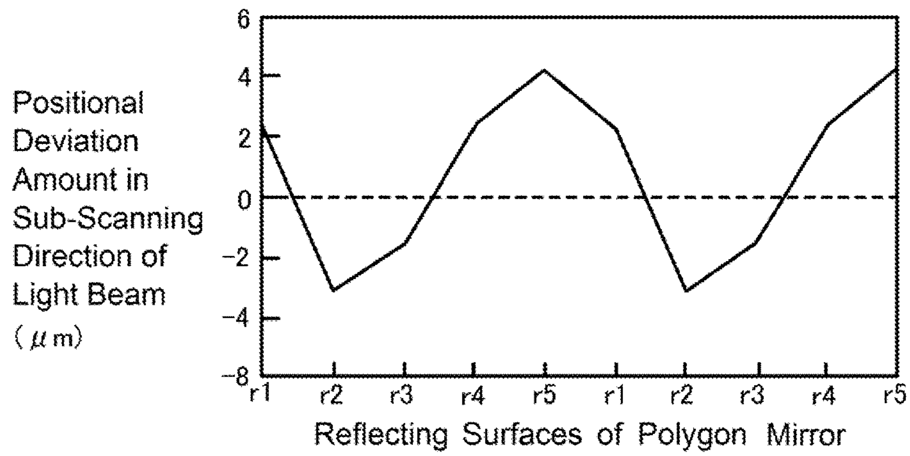
FIG. 9A illustrates one example of a variation characteristic of a positional deviation amount in the sub-scanning direction of the light beam associated with rotation of the polygon mirror, at a reference depth position.
Figure 9B:
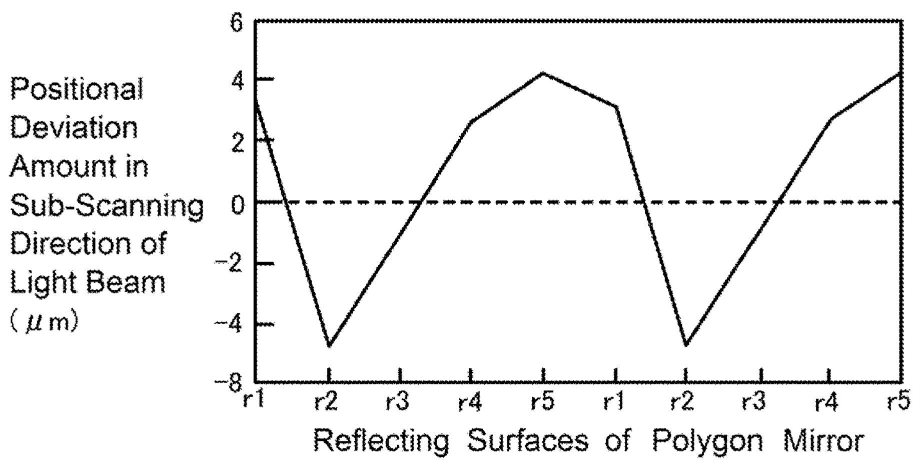
FIG. 9B illustrates one example of a variation characteristic of a positional deviation amount in the sub-scanning direction of the light beam associated with the rotation of the polygon mirror, at a first depth position.
Figure 9C:
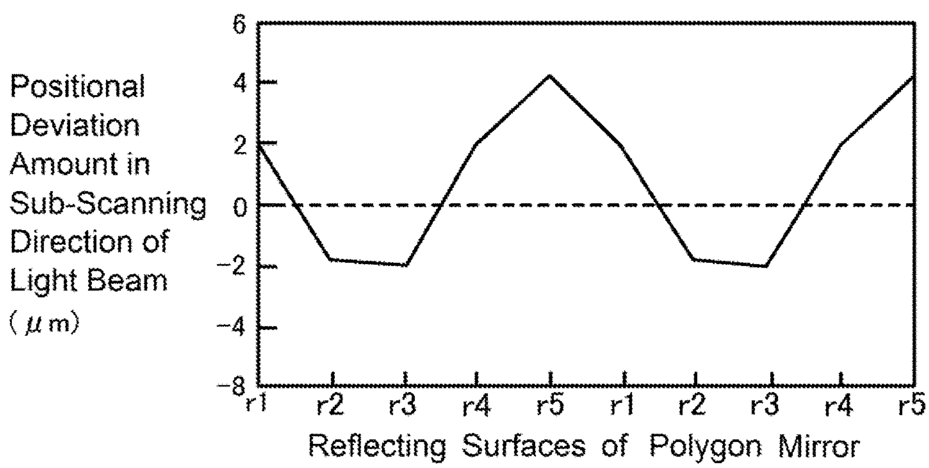
FIG. 9C illustrates one example of a variation characteristic of a positional deviation amount in the sub-scanning direction of the light beam associated with the rotation of the polygon mirror, at a second depth position.
Figure 10A:
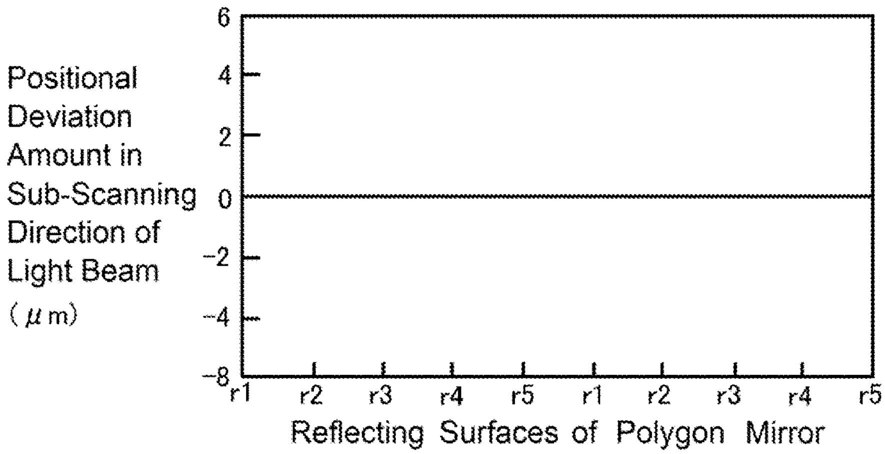
FIG. 10A illustrates an exemplary difference characteristic at the reference depth position.
Figure 10B:
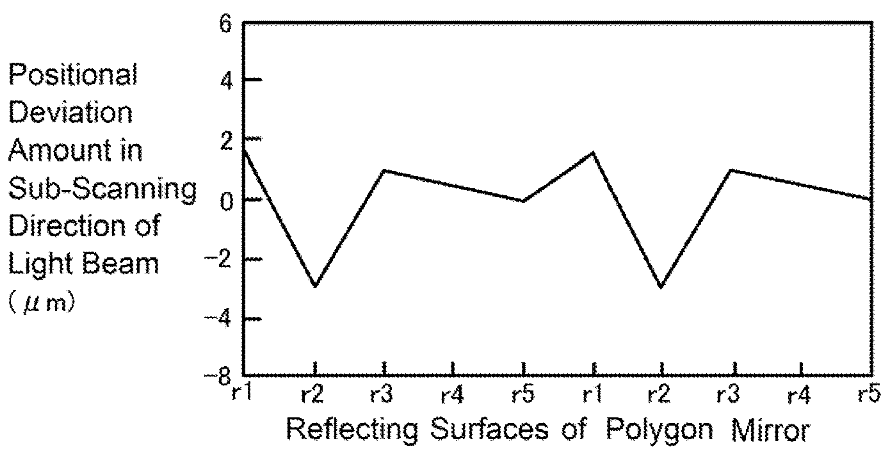
FIG. 10B illustrates an exemplary difference characteristic at the first depth position.
Figure 10C:
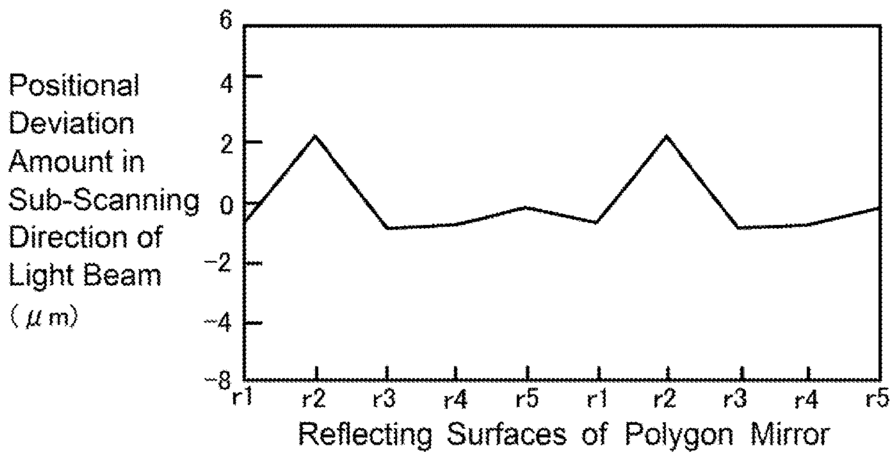
FIG. 10C illustrates an exemplary difference characteristic at the second depth position.

Graphs in FIGS. 9A, 9B, and 9C illustrate one example of calculation result of the variation characteristic of the positional deviation amount in the sub-scanning direction of the light beam at the reference depth position A0, the first depth position A1, and the second depth position A2. The vertical axes of the graphs represent the positional deviation amount in the sub-scanning direction of the light beam, and the horizontal axes represent the reflecting surfaces r1 to r5 of the polygon mirror 35 corresponding to the light beam. Then, the control unit 100 calculates difference values as a difference characteristic, by subtracting the variation characteristic at the reference depth position A0 from the variation characteristic of the positional deviation amount in the sub-scanning direction of the light beam at the respective depth positions A0, A1, and A2. FIGS. 10A, 10B, and 10C are graphs that indicate one example of the difference characteristics at the reference depth position AO, the first depth position A1, and the second depth position A2. In the following, the difference characteristics at the reference depth position A0, the first depth position A1, and the second depth position A2 are referred to as a reference-depth-position difference characteristic, a first-depth-position difference characteristic, and a second-depth-position difference characteristic, respectively. It is needless to say that the reference-depth-position difference characteristic becomes zero.

The control unit 100 determines the positional-deviation cause (the above-described first cause to the fourth cause) in the sub-scanning direction of the light beam based on the calculated first-depth-position difference characteristic and second-depth-position difference characteristic. A determination principle of the positional-deviation cause in the control unit 100 is described as follows. That is, in the case of the positional deviation (see FIG. 4A) cause in the sub-scanning direction of the light beam caused by the inclination of the reflecting surfaces r1 to r5 of the polygon mirror 35, the positional deviation of the light beam is generated at the surface of the photoreceptor drum 16; however, the light beam converges as heading toward the surface of the photoreceptor drum 16. In contrast to this, in the case of the positional deviation (see FIGS. 4B to 4D) in the sub-scanning direction of the light beam caused by the vibration of the optical element (the imaging lens 36 or the reflecting mirror 38), the light beam swings with the proximity of the incident position at the reflecting mirror 38 as the fulcrum. Consequently, in the former case (the case caused by the inclination of the reflecting surfaces r1 to r5), in cases of detecting the light beam at the image formation surface and detecting the light beam at a position separated from the image formation surface by a predetermined amount δ (for example, δ=0 to 10 mm), the positional deviation amount in the sub-scanning direction of the light beam significantly varies; however, in the latter case (the case caused by the vibration of the optical element), the positional deviation amount in the sub-scanning direction of the light beam hardly varies.

Therefore, calculating the first- and second-depth-position difference characteristics by subtracting the variation characteristic at the reference depth position A0 from the respective variation characteristics of the positional deviation amounts in the sub-scanning direction of the light beam at the first depth position A1 and the second depth position A2 enables obtaining the characteristics where influence of the positional deviation in the sub-scanning direction of the light beam caused by the vibration of the optical element is eliminated. One example of this is illustrated in the graphs in FIGS. 10B and 10C. It is possible to determine that the positional deviation in the sub-scanning direction, which can be read from the graphs, is caused by the inclination of the reflecting surface of the polygon mirror 35 not by the vibration of the optical element. Particularly in the examples of FIGS. 10B and 10C, it is possible to determine that the inclination of the reflecting surface r2 is large among the five reflecting surfaces r1 to r5 because the positional deviation amount in the sub-scanning direction of the light beam reflected at the reflecting surface r2 is large.

If the values of the first- and second-depth-position difference characteristics are zero at any of the reflecting surfaces r1 to r5, it is possible to determine that the positional-deviation cause in the sub-scanning direction of the light beam is not the above-described first cause (the inclination of the reflecting surface of the polygon mirror 35). Then, in that case, it is only necessary to perform more detail cause determination based on the variation characteristics (see FIGS. 9A to 9C) of the positional deviation amounts in the sub-scanning direction of the light beam at the respective depth positions A0 to A2, which have become the base for calculating the difference characteristic.

Figure 11:
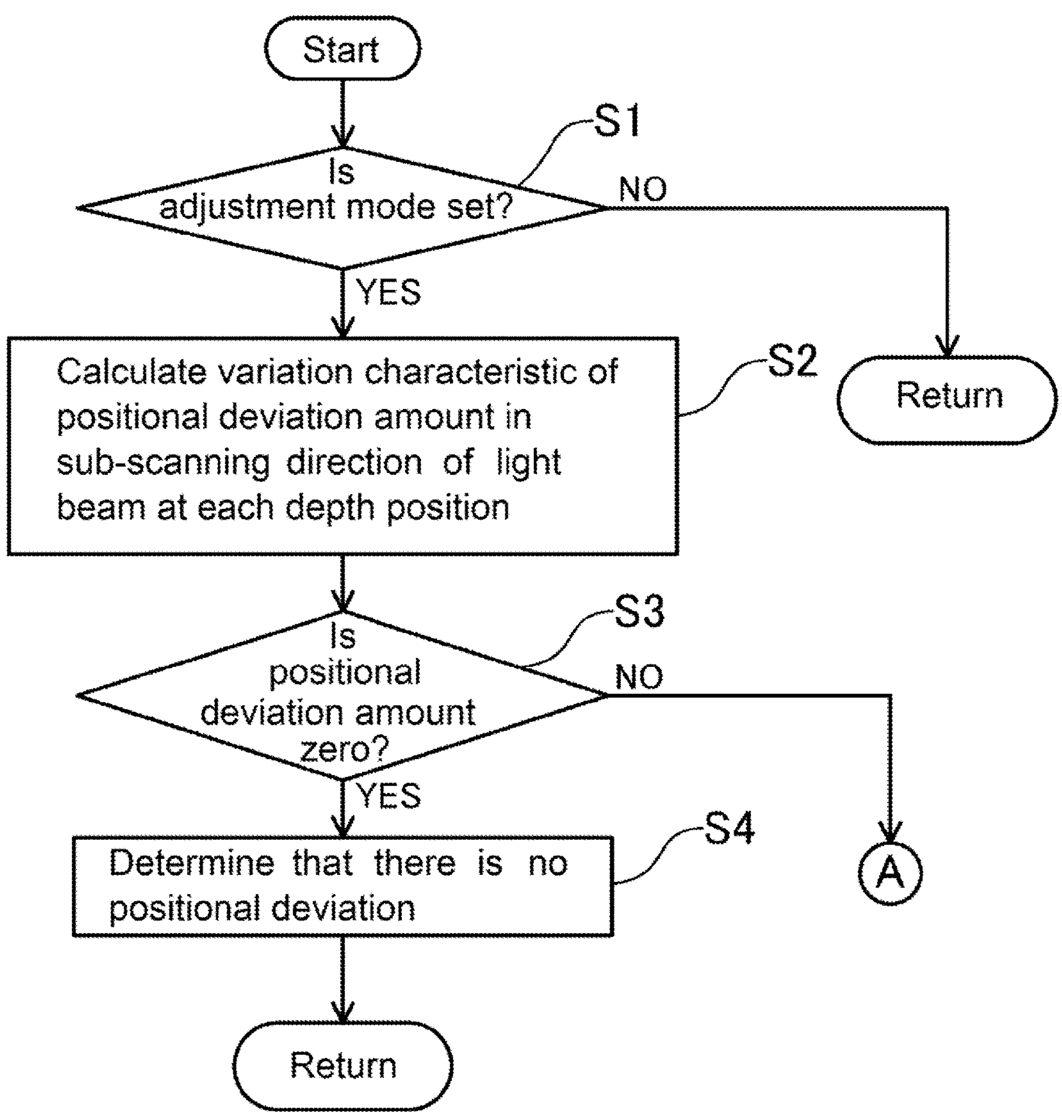
FIG. 11 illustrates a first half of the determination process of the positional-deviation cause in the sub-scanning direction of the light beam.
Figure 12:
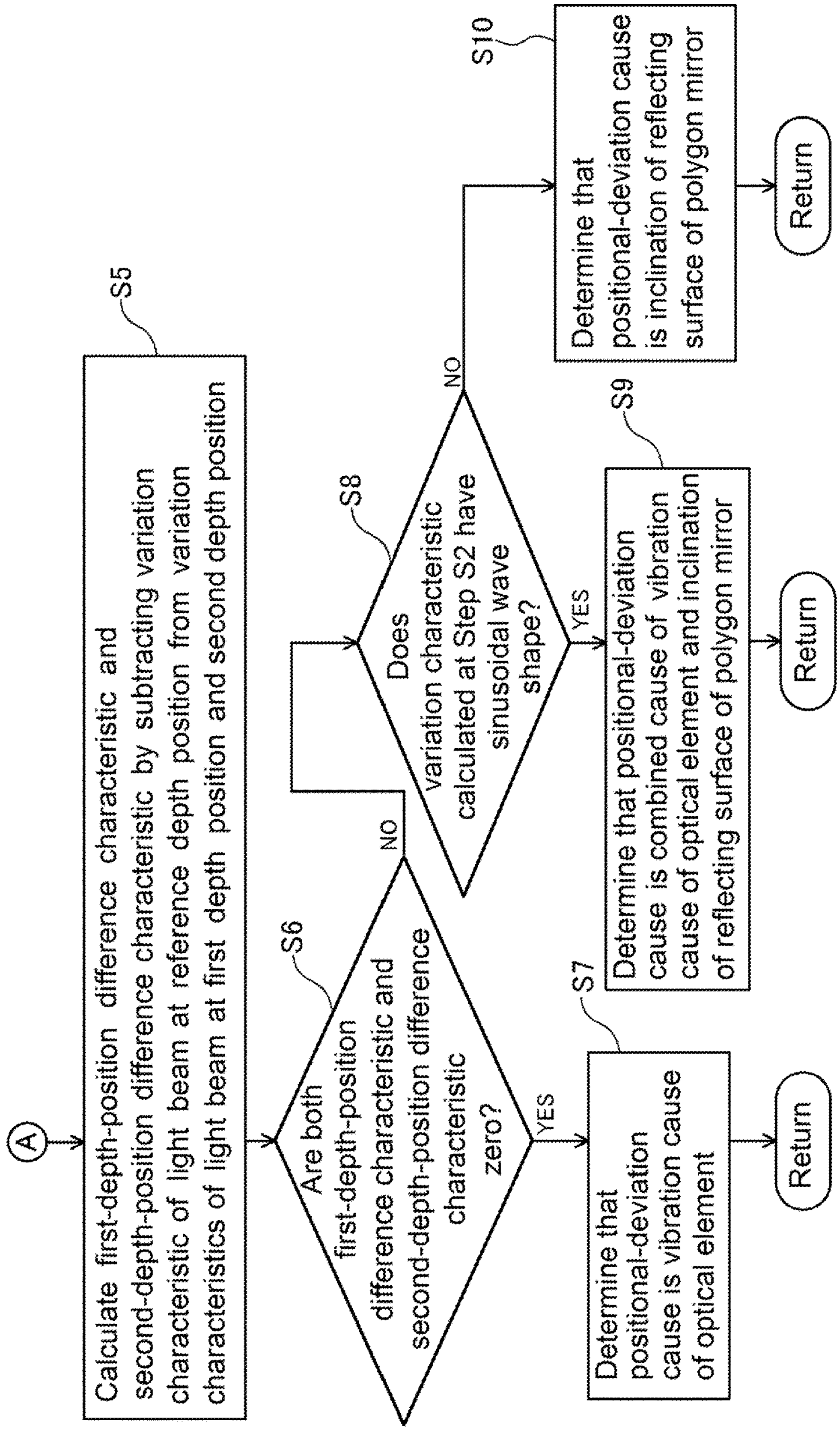
FIG. 12 illustrates a second half of the determination process of the positional-deviation cause in the sub-scanning direction of the light beam.

FIGS. 11 and 12 illustrate detail determination processes of the positional-deviation cause in the sub-scanning direction of the light beam. The determination process is executed by the control unit 100.

At Step S1, the control unit 100 determines whether a user sets an adjustment mode with an operation panel or not. When the determination is NO, the process returns, and when the determination is YES, the process proceeds to Step S2.

At Step S2, the control unit 100 calculates the variation characteristic of the positional deviation amount in the sub-scanning direction of the light beam at each of the reference depth position A0, the first depth position A1, and the second depth position A2.

At Step S3, the control unit 100 determines whether each variation characteristic calculated at Step S2 becomes zero at any of the reflecting surfaces r1 to r5 or not. When the determination is YES, the process proceeds to Step S4, and when the determination is NO, the process proceeds to Step S5 (see FIG. 12).

At Step S4, the control unit 100 determines that there is no positional deviation in the sub-scanning direction of the light beam at the surface of the photoreceptor drum 16, and then, the process returns.

At Step S5, the control unit 100 calculates the first-depth-position difference characteristic and the second-depth-position difference characteristic, which are described above, based on the variation characteristic of the positional deviation amount in the sub-scanning direction of the light beam at the respective depth positions A0 to A2 calculated at Step S2.

At Step S6, the control unit 100 determines whether the first-depth-position difference characteristic and the second-depth-position difference characteristic calculated at Step S5 are zero at any of the reflecting surfaces r1 to r5 or not. When the determination is NO, the process proceeds to Step S8, and when the determination is YES, the process proceeds to Step S7.

At Step S7, the control unit 100 determines that the positional-deviation cause in the sub-scanning direction of the light beam at the surface of the photoreceptor drum 16 is the vibration causes of the optical elements (the second to fourth causes), and then, the process returns.

At Step S8, the control unit 100 determines whether the variation characteristic of the light beam at the respective depth positions A0 to A2 calculated at Step S2 has a sinusoidal wave shape or not. Specifically, the control unit 100 performs a curve approximation on each variation characteristic with an approximation method such as spline interpolation to determine whether the curve has a sinusoidal wave shape or not. Then, when the determination is NO, the process proceeds to Step S10, and when the determination is YES, the process proceeds to Step S9.

At Step S9, the control unit 100 determines that the positional-deviation cause in the sub-scanning direction of the light beam at the surface of the photoreceptor drum 16 is a combined cause of the inclination of the reflecting surfaces r1 to r5 of the polygon mirror 35 (the first cause) and the vibration of the optical element (the second to fourth causes), and then, the process returns.

At Step S10, the control unit 100 determines that the positional-deviation cause in the sub-scanning direction of the light beam at the surface of the photoreceptor drum 16 is the inclination of the reflecting surfaces r1 to r5 of the polygon mirror 35 (the first cause), and then, the process returns.

As described above, in the embodiment, the light detection region 51*a* of the first light detection sensor 51 and the light detection region 52*a* of the second light detection sensor 52 each have a slit shape and are arranged to have mutually different angles with respect to the scanning direction of the light beam.

This configuration generates a difference in the time period until when the light beam arrives at the second light detection region 52*a* after passing through the light detection region 51*a* at the position in the sub-scanning direction of the light beam. Consequently, converting the time difference ΔT into the distance W in the sub-scanning direction enables accurately obtaining the variation characteristic of the positional deviation amount in the sub-scanning direction of the light beam associated with the rotation of the polygon mirror 35.

In the embodiment, as described above, the control unit 100 can determine that the positional-deviation cause in the sub-scanning direction of the light beam at the surface of the photoreceptor drum 16 is caused by the inclination of the reflecting surfaces r1 to r5 of the polygon mirror 35, is caused by the vibration of the optical element (the imaging lens 36 or the reflecting mirror 38), or is caused by the combined cause of the inclination of the reflecting surfaces r1 to r5 of the polygon mirror 35 and the vibration of the optical element.

Consequently, this enables taking an appropriate countermeasure to reduce the image failure in accordance with the positional-deviation cause in the sub-scanning direction of the light beam. This countermeasure may be manually performed by a user or may be automatically performed by the control unit 100.

Other Embodiments

While in the above-described embodiment the driving unit 53 sequentially moves the light detection unit 50 to the reference depth position A0, the first depth position A1, and the second depth position A2 to obtain the variation characteristic of the positional deviation amount in the sub-scanning direction of the light beam associated with the rotation of the polygon mirror 35, at the respective depth positions A0 to A2, this should not be construed in a limiting sense. For example, with the driving unit 53 eliminated, total three light detection units 50 may be arranged one by one at the respective depth positions A0 to A2.

While the above-described example shows the example where the ball screw mechanism is employed as one example of the driving unit 53, this should not be construed in a limiting sense, and the driving unit 53 may be constituted from, for example, an electromagnetic solenoid, an air cylinder, or similar component.

While in the above-described embodiment the process returns after Steps S9 and S10, this should not be construed in a limiting sense. That is, next to Steps S9 and S10, the reflecting surfaces r1 to r5 where the inclination occurs may be further identified. Specifically, by calculating the positional deviation amount of the light beam at the respective reflecting surfaces r1 to r5, the surface where the calculated positional deviation amount exceeds a predetermined threshold value may be identified as "the surface where the inclination occurs."

In the above-described embodiment, when calculating the variation characteristic of the positional deviation amount in the sub-scanning direction of the light beam, the control unit 100 may obtain the variation characteristic of the positional deviation amount in the sub-scanning direction of the light beam multiple times and then, may average the obtained variation characteristics.

This ensures obtaining the accurate variation characteristic while eliminating variation factors of the rotation speed of the polygon mirror 35 as much as possible.

While in the above-described embodiment the laser printer 1 as one example of the image forming apparatus is described, this should not be construed in a limiting sense. The image forming apparatus may be a copier, a facsimile, a multi-functional peripheral (MFP) or similar apparatus.

As described above, the disclosure is useful for a light scanning device and an image forming apparatus including this light scanning device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus comprising:

a light scanning device that includes a light source, a polygon mirror that reflects a light beam emitted from the light source and causes the light beam to deflectively scan, and an optical element located in an optical path of the light beam deflectively scanned at the polygon mirror;

a light detection unit that is located in an optical path of the light beam after the light beam has passed through the optical element, includes a slit-shaped first light detection region and a slit-shaped second light detection region arranged to have mutually different angles with respect to a scanning direction of the light beam, and outputs a detection signal when the light beam passes through each of the light detection regions; and a positional-deviation-amount calculation unit that calculates a time period until when the light beam passes through the second light detection region from when the light beam has passed through the first light detection region for each scan of the light beam based on the detection signal output from the light detection unit, and calculates a variation characteristic of a positional deviation amount in a sub-scanning direction of the light beam associated with rotation of the polygon mirror based on the calculated time period.

2. The image forming apparatus according to claim 1, wherein:

the light detection unit is configured to detect the light beam at a plurality of predetermined depth positions whose positions in a depth direction are different;

the positional-deviation-amount calculation unit, at each of the plurality of predetermined depth positions, is configured to calculate the variation characteristic of the positional deviation amount in the sub-scanning direction of the light beam associated with the rotation of the polygon mirror based on the detection signal output from the light detection unit; and the image forming apparatus further includes a determining unit that determines an occurrence cause of the positional deviation in the sub-scanning direction of the light beam, based on the variation characteristic of the positional deviation amount in the sub-scanning direction of the light beam at the plurality of predetermined depth positions calculated by the positional-deviation-amount calculation unit.

3. The image forming apparatus according to claim 2, wherein:

the plurality of predetermined depth positions include a reference depth position located at a position that is flush with an image formation surface of the light beam and a separation depth position separated by a predetermined amount in the depth direction with respect to the reference depth position;

the image forming apparatus further includes a difference-characteristic calculation unit that calculates a difference value of the variation characteristics of the positional deviation amounts in the sub-scanning direction of the light beam at the reference depth position and the separation depth position calculated by the positional-deviation-amount calculation unit as a difference characteristic; and the determining unit is configured to determine that the occurrence cause of the positional deviation in the sub-scanning direction of the light beam is caused by an inclination of the polygon mirror, is caused by a vibration of the optical element, or is a combined cause of the inclination of the polygon mirror and the vibration of the optical element, based on the variation characteristics of the positional deviation amounts in the sub-scanning direction of the light beam at the reference depth position and the separation depth position calculated by the positional-deviation-amount calculation unit and the difference characteristics at the reference depth position and the separation depth position calculated by the difference-characteristic calculation unit.

4. The image forming apparatus according to claim 1, wherein the positional-deviation-amount calculation unit is configured to obtain the variation characteristic of the positional deviation amount in the sub-scanning direction of the light beam multiple times when calculating the variation characteristic of the positional deviation amount in the sub-scanning direction of the light beam, and to average the obtained variation characteristics.

* * * * *